(12) United States Patent
Cheng

(10) Patent No.: US 7,611,777 B2
(45) Date of Patent: Nov. 3, 2009

(54) ORNAMENTAL STRUCTURE FOR THIN TYPE PLANAR TV

(76) Inventor: Chuan Fan Cheng, 3F, No. 4, Alley 28, Lane 284, Wu Hsin Street, Taipei (TW)

( * ) Notice: Subject to any disclaimer, the term of this patent is extended or adjusted under 35 U.S.C. 154(b) by 578 days.

(21) Appl. No.: 11/189,769

(22) Filed: Jul. 27, 2005

(65) Prior Publication Data

US 2006/0124566 A1    Jun. 15, 2006

(30) Foreign Application Priority Data

Jul. 28, 2004    (TW)    .............................. 93211971 U

(51) Int. Cl.
*F16M 11/04*    (2006.01)
*F16M 11/06*    (2006.01)
*A47G 35/00*    (2006.01)

(52) U.S. Cl. ................. 428/542.2; 248/176.3; 248/675; 248/292.14; 248/299.1; 248/918; 248/674

(58) Field of Classification Search ............... 248/176.3, 248/674, 675, 292.14, 299.1, 918
See application file for complete search history.

(56) References Cited

FOREIGN PATENT DOCUMENTS

JP    2000314240    * 11/2000

* cited by examiner

*Primary Examiner*—Timothy M Speer
*Assistant Examiner*—Gordon R Baldwin
(74) *Attorney, Agent, or Firm*—The Weintraub Group, PLC

(57) ABSTRACT

Disclosed is an ornamental structure, which includes an ornament that can be a picture or any of a variety of artwork for decorating a thin type planar TV and keeping the thin type planar TV from sight when not watching, and a support unit that supports the ornament and allows the ornament to be alternatively set between a first position to keep the thin type planar TV from right and a second position to let the thin type planar TV be seen.

11 Claims, 13 Drawing Sheets

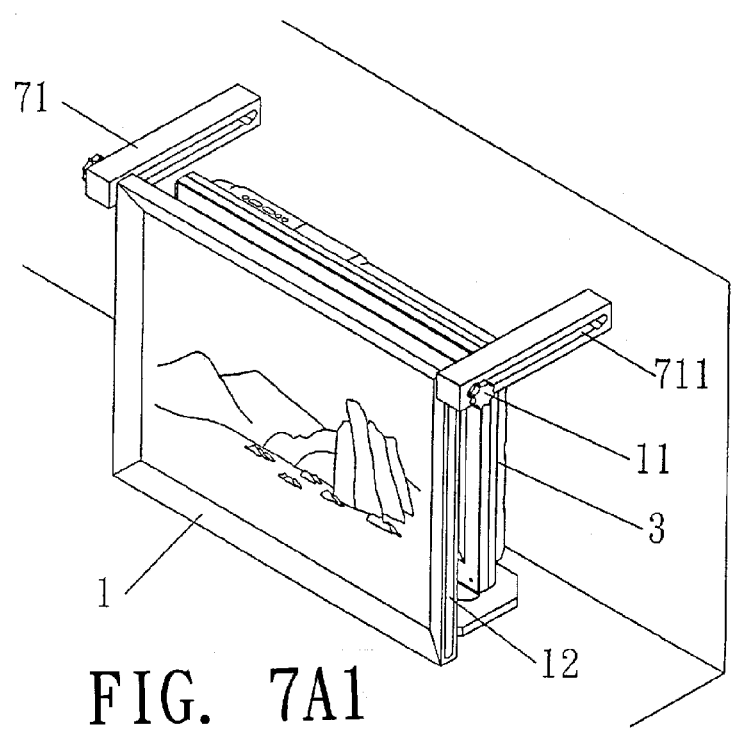
FIG. 7A1
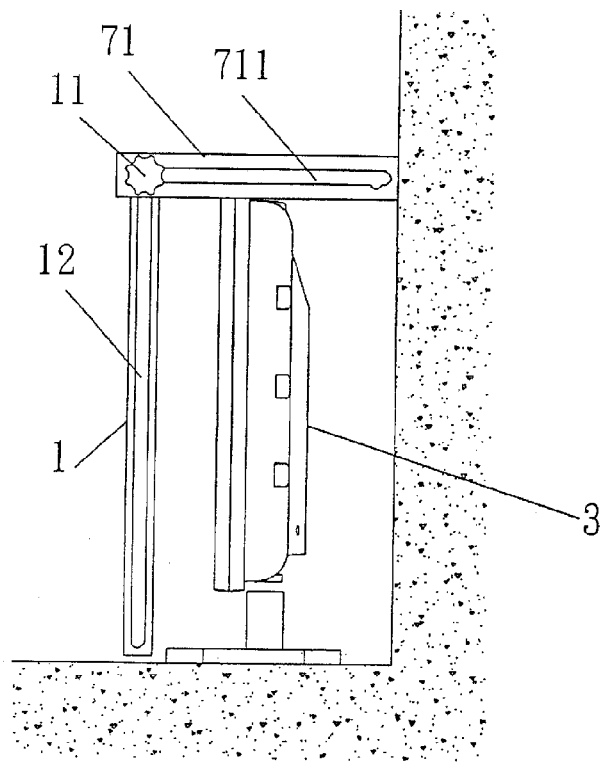
FIG. 7A2

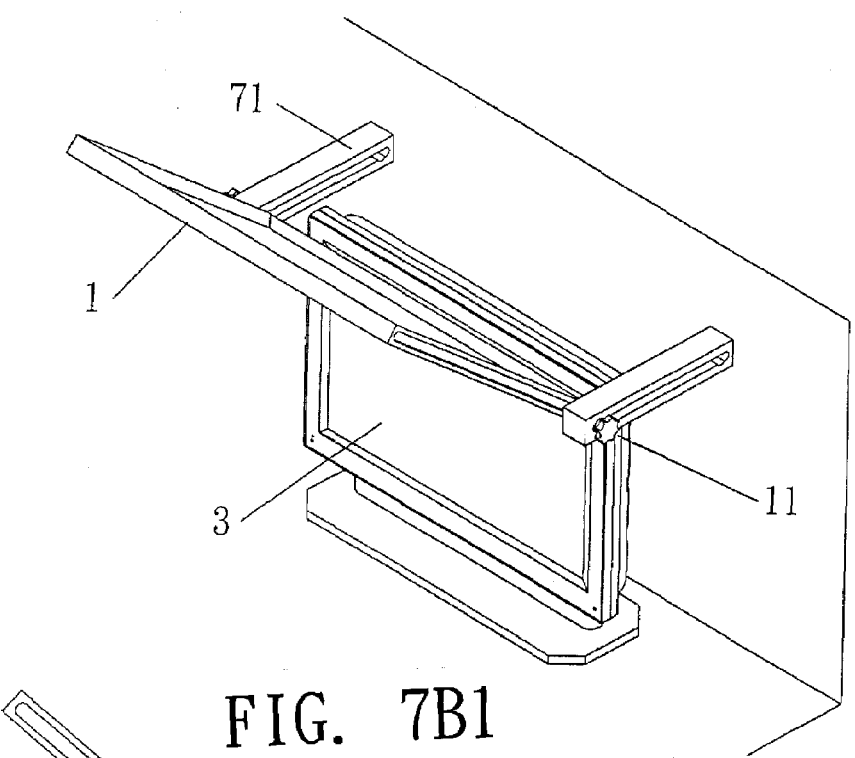
FIG. 7B1
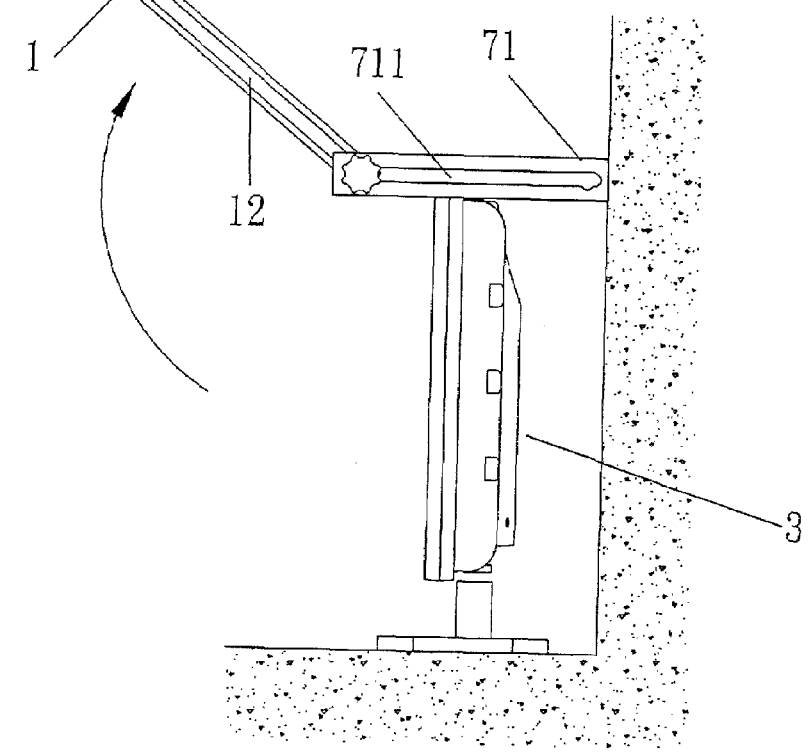
FIG. 7B2

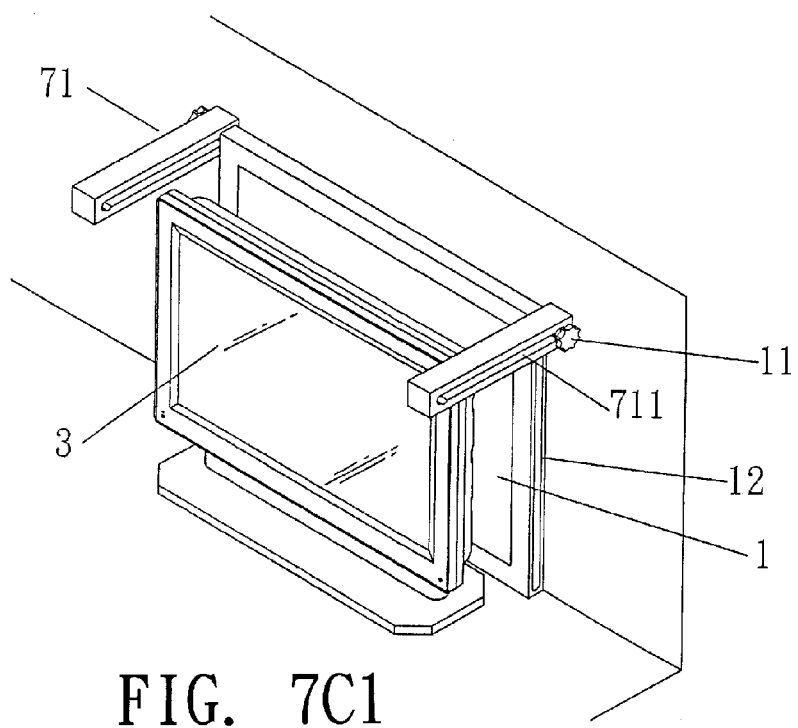
FIG. 7C1
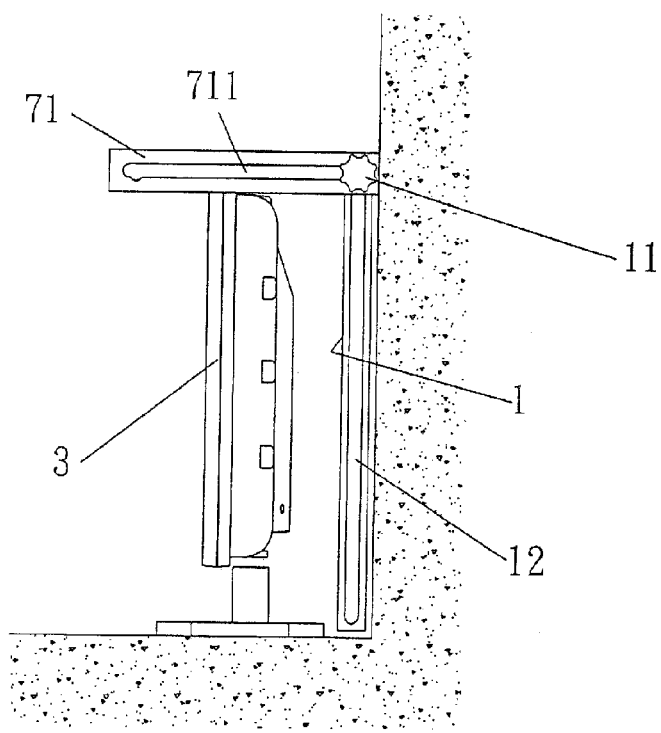
FIG. 7C2

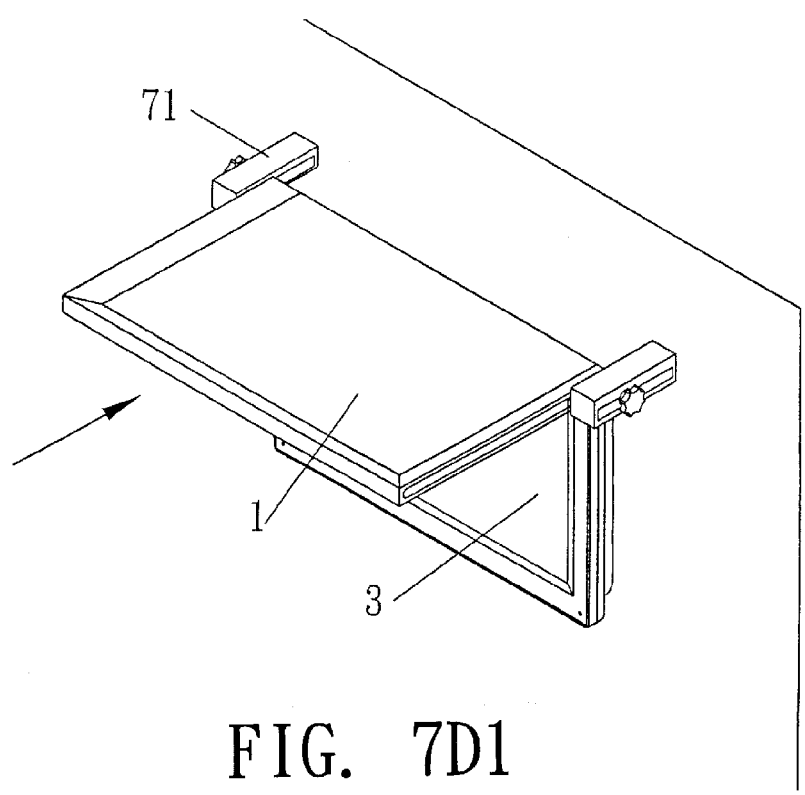
FIG. 7D1
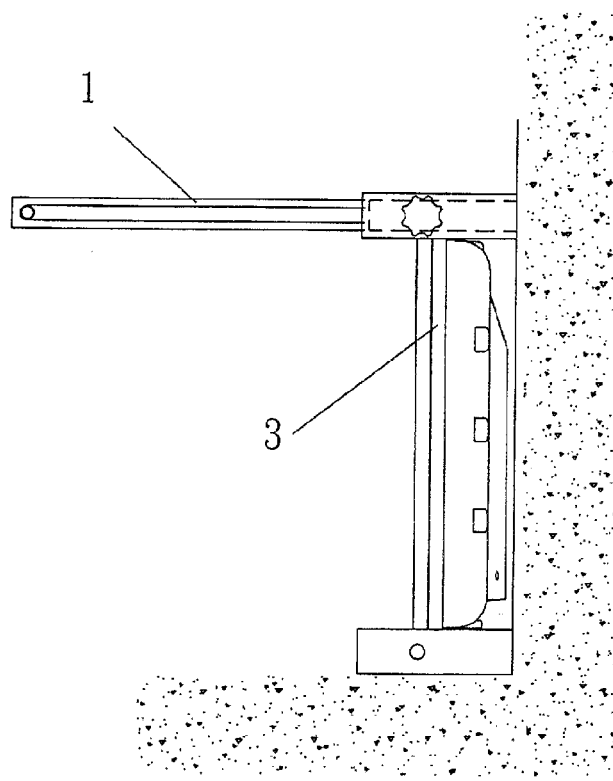
FIG. 7D2

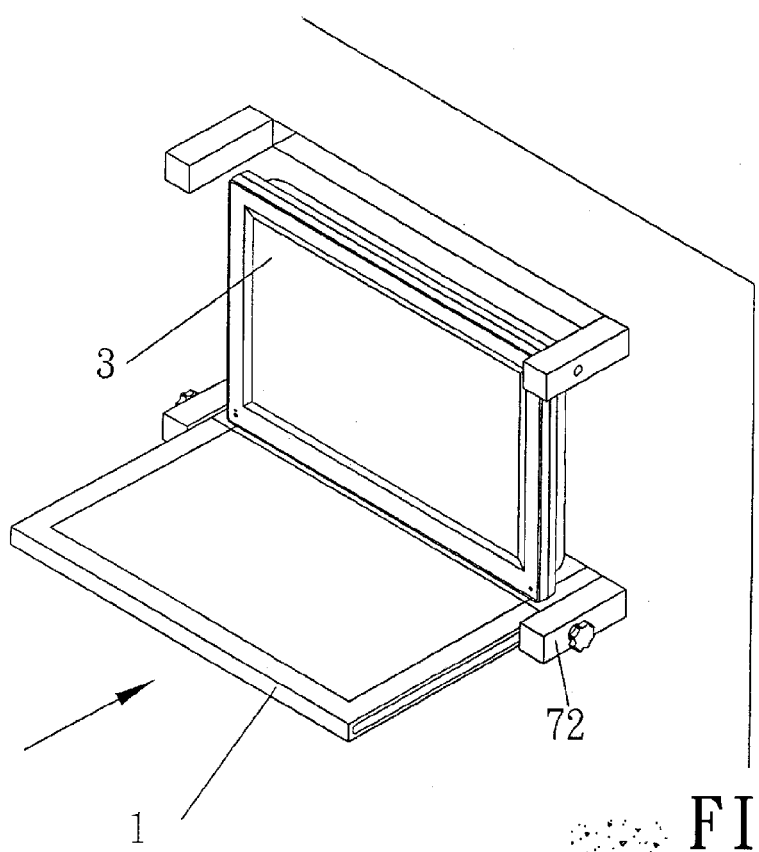
FIG. 7E1
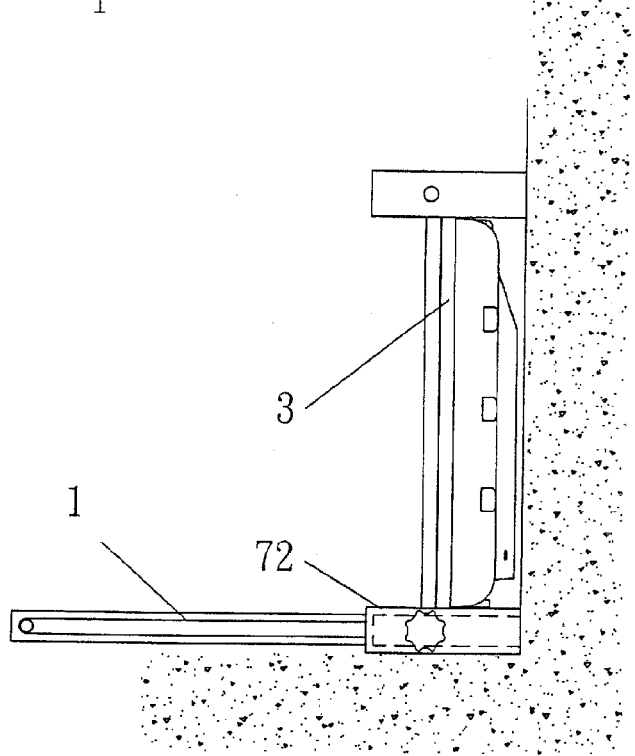
FIG. 7E2

ORNAMENTAL STRUCTURE FOR THIN TYPE PLANAR TV

BACKGROUND OF THE INVENTION

1. Field of the Invention

The present invention relates to a TV ornamental structure and more particularly, to an ornamental structure for thin type planar TV.

2. Description of the Related Art

Following fast development of high technology, a variety of thin type planar TVs have been developed and have appeared on the market to substitute for conventional CRT type TVs. Nowadays, big scale LCD and plasma TVs are popular. Nowadays, every ordinary person can set up a home theater at home.

It is a pleasant thin to enjoy watching TV program of a big scale thin type planar TV. However, a big scale thin type planar TV may not match the existing indoor design of the house, affecting the sense of beauty of the existing indoor design.

SUMMARY OF THE INVENTION

The present invention has been accomplished under the circumstances in view. It is therefore the main object of the present invention to provide an ornamental structure for thin type planar TV that decorates the house and keeps the thin type planar TV from sight when not watching TV. To achieve this and other objects of the present invention, the ornamental structure comprises a support unit and an ornament. The support unit supports the ornament, allowing the ornament to be alternatively set between a first position where the ornament keeps the thin type planar TV from sight, and a second position where the ornament is kept away from the thin type planar TV for enabling the user to watch TV. Further, the ornament can be a picture or any of a variety of artwork that has a broad area sufficient to keep the thin type planar TV from sight.

BRIEF DESCRIPTION OF THE DRAWINGS

FIG. 7A are side plain view and elevational view of an ornamental structure according to a sixth embodiment of the present invention.

FIG. 7B are schematic front and side views showing the position adjustment of the ornamental structure according to the sixth embodiment of the present invention.

FIG. 7C corresponds to FIG. 7B, showing the position of the ornamental structure adjusted.

FIG. 7D are side plain view and elevational view of an ornamental structure according to a seventh embodiment of the present invention.

FIG. 7E are side plain view and elevational view of an ornamental structure according to an eighth embodiment of the present invention.

DETAILED DESCRIPTION OF THE INVENTION

Figure 1:
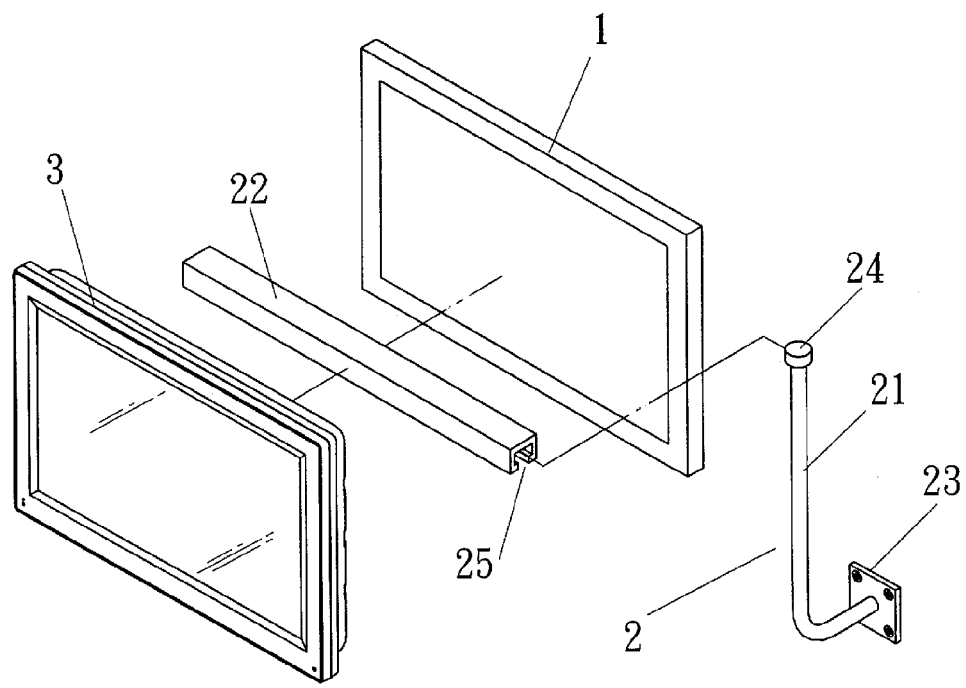
FIG. 1 is an exploded view of an ornamental structure according to a first embodiment of the present invention.
Figure 2:
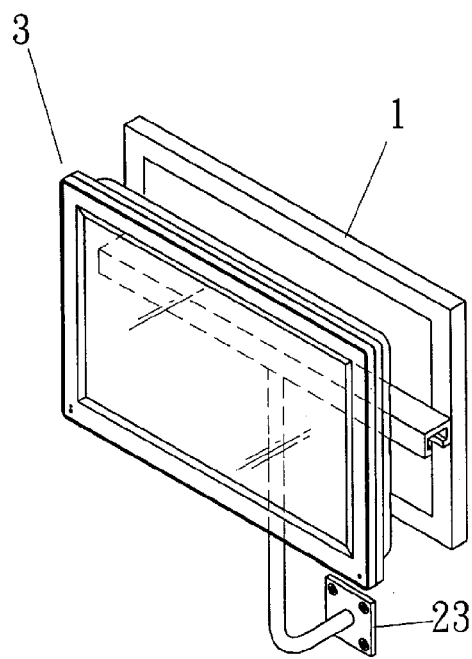
FIG. 2 is a perspective assembly view of the first embodiment of the present invention.

Referring to FIGS. 1 and 2, an ornamental structure for thin type planar TV in accordance with the present invention is shown comprised of an ornament 1 and a support unit 2. The ornament 1 can be an artwork, for example, a picture. The support unit 2 comprises a L-shaped supporting arm 21 and a sliding member 22. The L-shaped supporting arm 21 has one end fixedly provided with a mounting board 23 for fastening to a flat wall, and the other end terminating in an upward coupling portion 24. The sliding member 22 is fixedly connected between the ornament 1 and the thin type planar TV 3, having a transversely extending coupling groove 25 coupled to the upward coupling portion 24 of the L-shaped supporting arm 21. Therefore, the sliding member 22 can be moved horizontally relative to the L-shaped supporting arm 21.

Figure 3A:
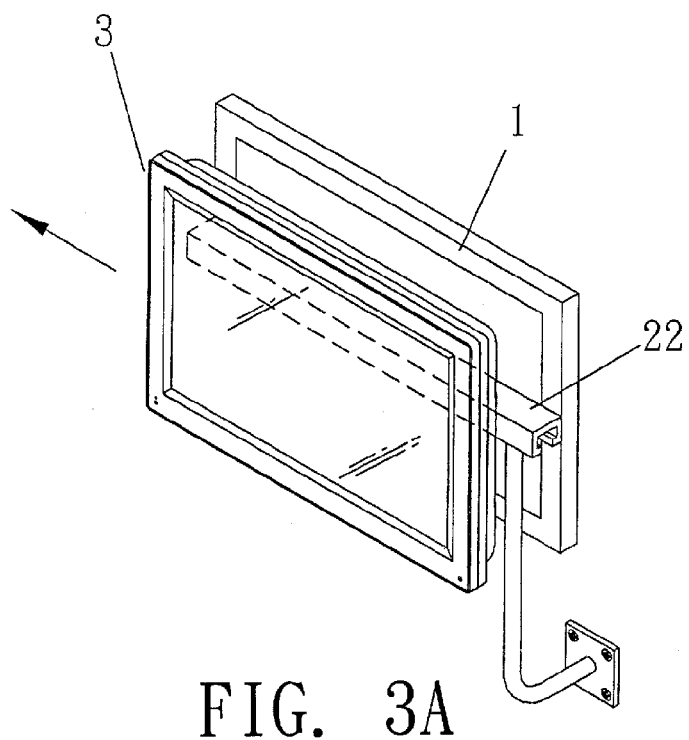
FIG. 3A is a schematic drawing showing the position adjustment of the ornamental structure according to the first embodiment of the present invention (I).
Figure 3B:
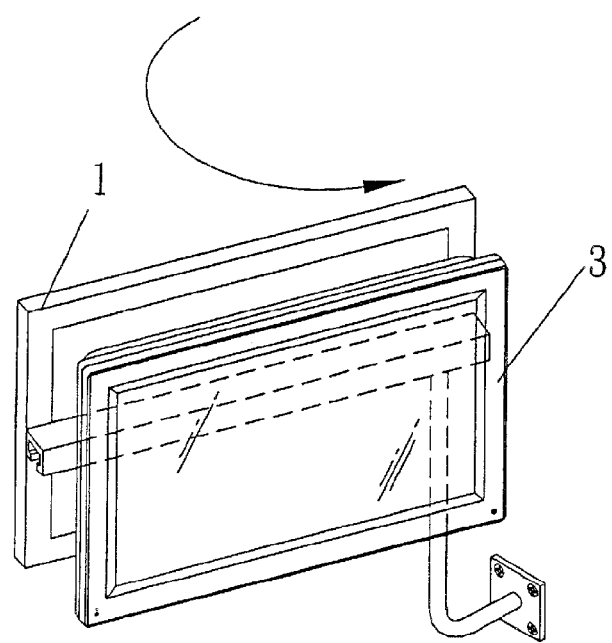
FIG. 3B is a schematic drawing showing the position adjustment of the ornamental structure according to the first embodiment of the present invention (II).
Figure 3C:
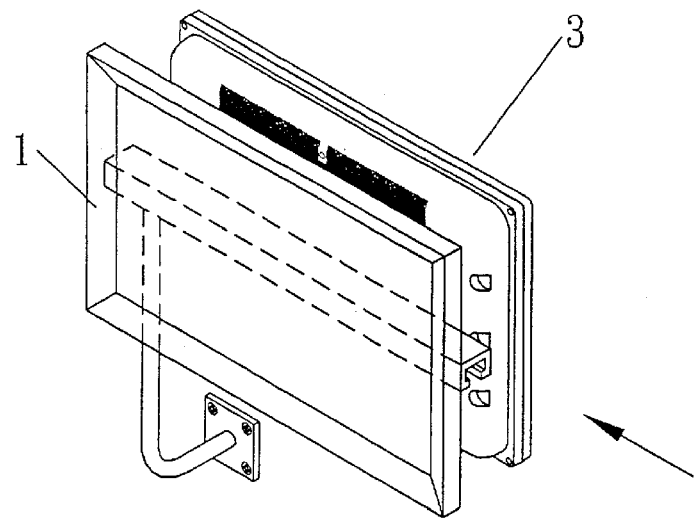
FIG. 3C is a schematic drawing showing the position adjustment of the ornamental structure according to the first embodiment of the present invention (III).
Figure 3D:
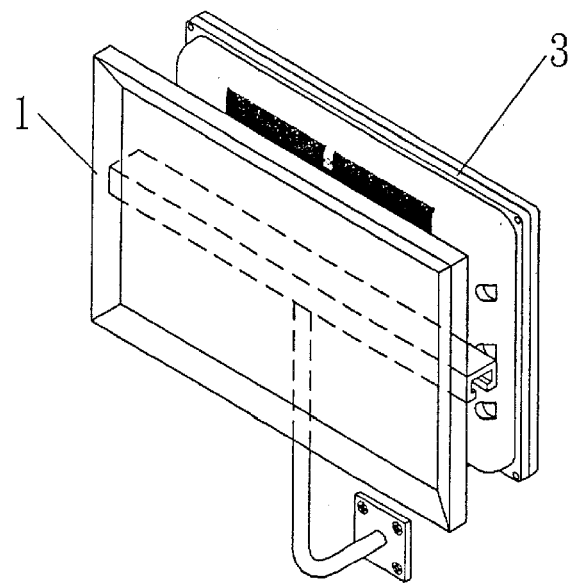
FIG. 3D is a schematic drawing showing the position adjustment of the ornamental structure according to the first embodiment of the present invention (IV).

Referring to FIGS. 3A through 3D, the ornament 1, the thin type planar TV 3 and the sliding member 22 are assembled together, allowing the sliding member 22 to be moved horizontally relative to the upward coupling portion 24. The position of the ornament 1 and the position of the thin type planar TV 3 can be exchanged. When wishing to change the position of the ornament 1 and the position of the thin type planar TV 3, move the ornament 1 and the thin type planar TV 3 with the sliding member 22 to the left limit or right limit (relative to the upward coupling portion of the L-shaped supporting arm) as shown in FIG. 3A, and then turn the ornament 1 and the position of the thin type planar TV 3 horizontally to exchange the position of the ornament 1 with the position of the thin type planar TV 3 as shown in FIG. 3B, and then move the ornament 1 and the thin type planar TV 3 to the center position as shown in FIG. 3C, and therefore the position of the ornament 1 and the position of the thin type planar TV 3 are exchanged as shown in FIG. 3D.

Figure 4A:
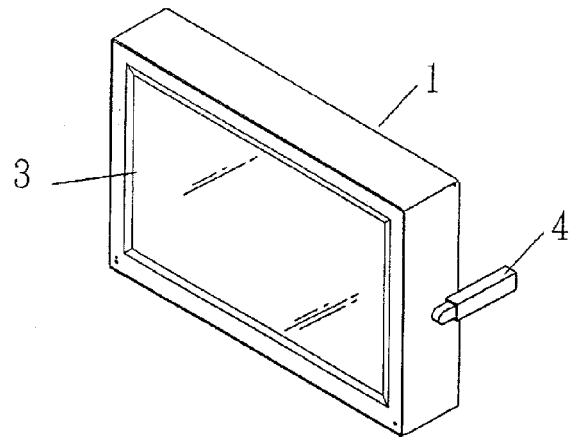
FIG. 4A is an elevational view of an ornamental structure according to a second embodiment of the present invention.
Figure 4B:
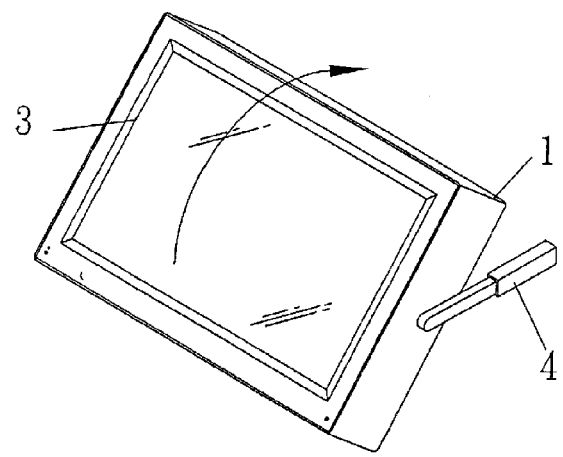
FIG. 4B is a schematic drawing showing the position adjustment of the ornamental structure according to the second embodiment of the present invention (I).
Figure 4C:
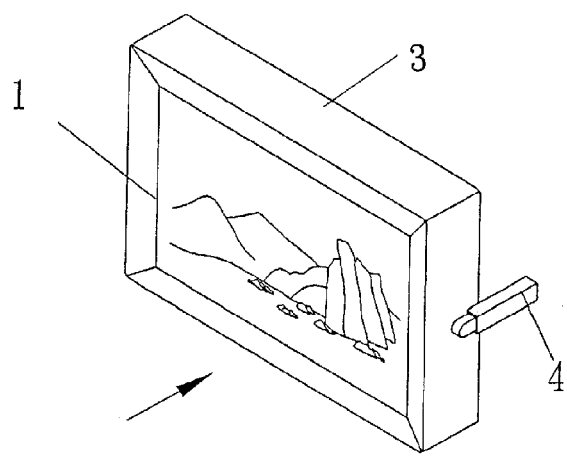
FIG. 4C is a schematic drawing showing the position adjustment of the ornamental structure according to the second embodiment of the present invention (II).

FIGS. 4A through 4C show an alternate form of the present invention. According to this embodiment, the support unit comprises two suspension arms 4 pivotally connected to the two opposite lateral sides of the assembly of the ornament 1 and the thin type planar TV 3. The ornament 1 and the thin type planar TV 3 are connected in parallel. The assembly of the ornament 1 and thin type planar TV 3 can be rotated relative to the support arms 4 to have the ornament 1 (or the thin type planar TV 3) be positioned at the front side and the thin type planar TV 3 (or the ornament 1) be positioned at the rear side as desired.

Figure 5A:
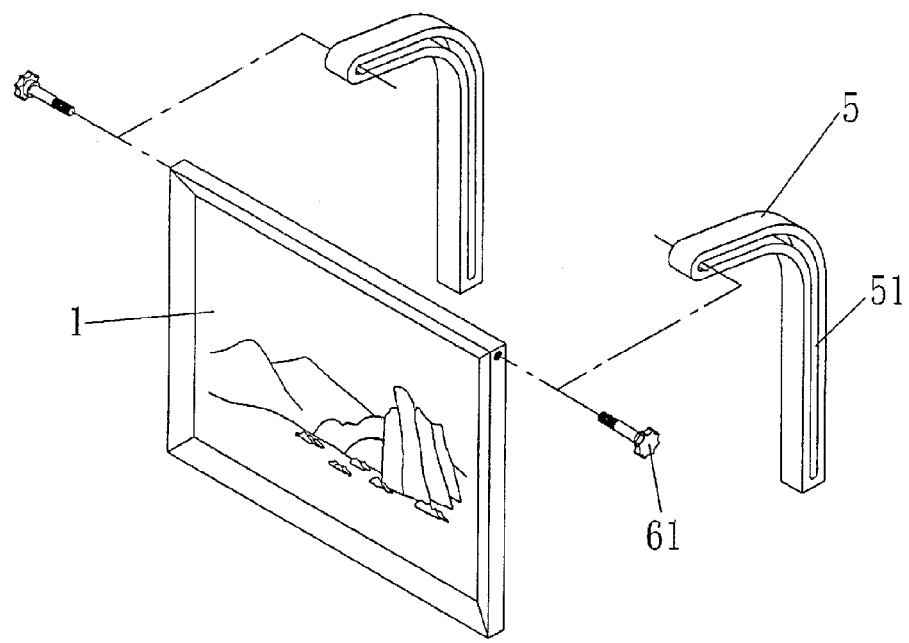
FIG. 5A illustrates an ornamental structure according to a third embodiment of the present invention.
Figure 5B:
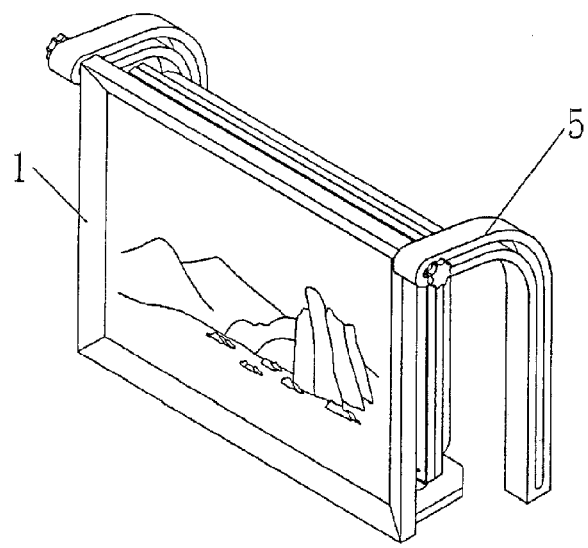
FIG. 5B is a schematic drawing showing the position adjustment of the ornamental structure according to the third embodiment of the present invention (I).
Figure 5C:
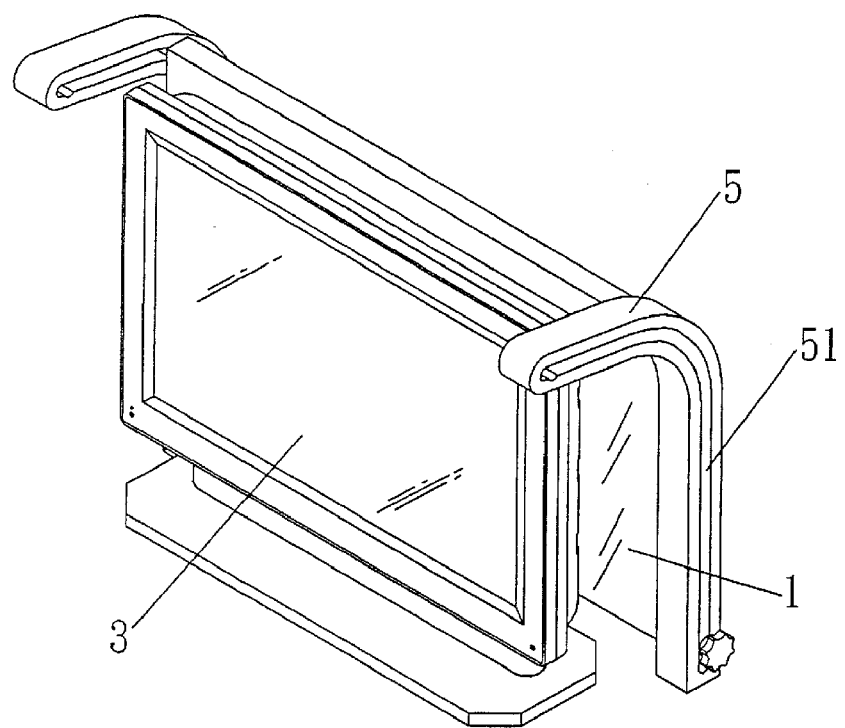
FIG. 5C is a schematic drawing showing the position adjustment of the ornamental structure according to the third embodiment of the present invention (II).

FIGS. 5A~5C show another alternate form of the present invention. According to this embodiment, the support unit comprises two substantially angled supporting arms 5 arranged in parallel, and an ornament 1 coupled between the supporting arms 5. The angled supporting arms 5 each have a sliding groove 51. The ornament 1 has two pivot members 61 disposed at two opposite lateral sides and respectively slidably coupled to the sliding grooves 51 of the angled supporting arms 5. This design allows the user to move ornament 1 relative to the angled supporting arms 5 and then turned forwards or backwards between a first position in front of the thin type planar TV 3 and a second position behind the thin type planar TV 3.

Figure 5D:
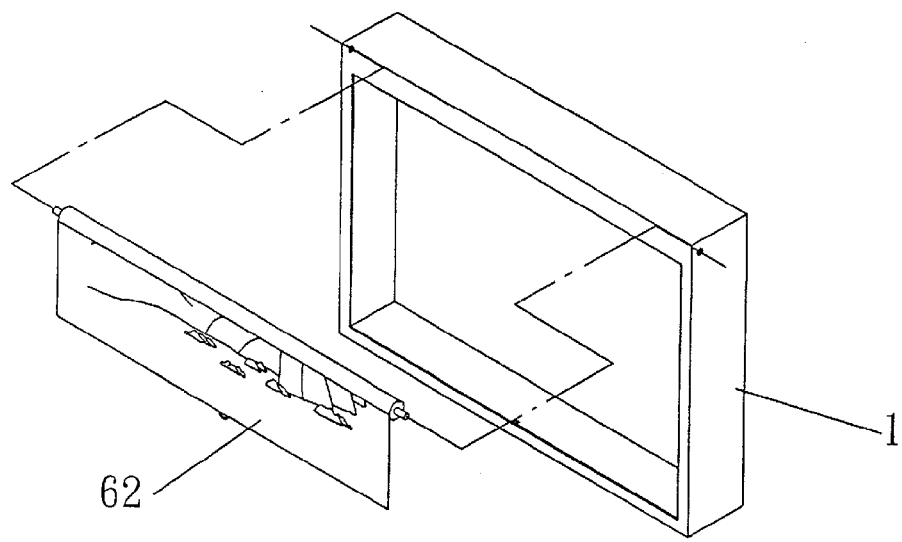
FIG. 5D is an exploded view of an ornamental structure according to a fourth embodiment of the present invention.
Figure 5E:
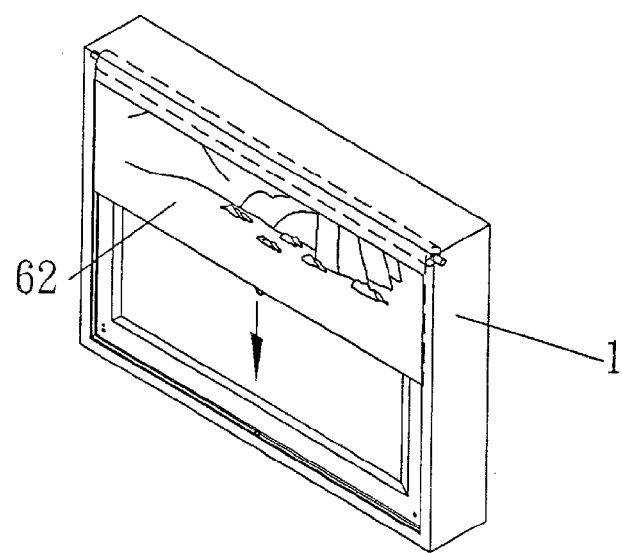
FIG. 5E is a perspective assembly view of the ornamental structure according to the fourth embodiment of the present invention.

Referring to FIGS. 5D and 5E, the ornament 1 according to this embodiment is a hollow box adapted to accommodate a thin type planar TV 3, having a printed shade roller 62 mounted on the front open side thereof. The printed shade roller 62 can be extended out to kept the thin type planar TV 3 from sight and to show the design thereon.

Figure 6:
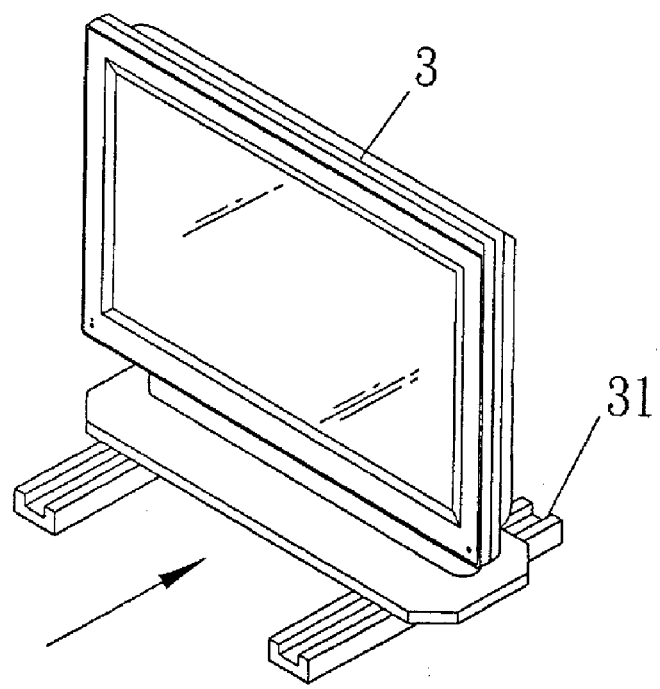
FIG. 6 is a perspective view of a part of an ornamental structure according to a fifth embodiment of the present invention.

Referring to FIG. 6, two sliding rails 31 are horizontally arranged in parallel to support the thin type planar TV 3, allowing the thin type planar TV 3 to be moved forwards/backwards along the sliding rails 31.

FIGS. 7A~7C show still another alternate form of the present invention. According to this embodiment, the support unit comprises two horizontal supporting arms 71 perpendicularly fastened to a vertical wall and arranged in parallel. The horizontal supporting arms 71 each have a sliding slot 711 extending along the length. The ornament 1 has two sliding grooves 12 at two opposite lateral sides thereof. Two pivot bolts 11 are respectively inserted through the sliding slots 711 of the horizontal supporting arms 71 into the sliding grooves 12 to secure the ornament 1 to the horizontal supporting arms 71, allowing the ornament 1 to be moved vertically relative to the pivot bolts 11 and turned about the pivot bolts 11 and alternatively set between a first position in front of the thin type planar TV 3 and a second position behind the thin type planar TV 3.

FIG. 7D shows still another alternate form of the present invention. This embodiment is substantially similar to the embodiment shown in FIGS. 7A~7C. However, the ornament 1 according to this embodiment can be alternatively set between a vertical position in front of the thin type planar TV 3 to keep the thin type planar TV 3 from sight, and a horizontal position right above the thin type planar TV 3.

FIG. 7E shows still another alternate form of the present invention. According to this embodiment, the support unit comprises two sliding grooves 72 arranged in parallel at the bottoms die of the thin type planar TV 3. When the pivot bolts are loosed from the ornament, the ornament 1 can be closely attached to the floor.

As indicated above, the ornament 1 and the support unit 2 are matched to decorate the thin type planar TV and to keep the thin type planar TV from sight when not watching the TV. The ornament 1 can be a picture or any of a variety of artwork.

Although particular embodiments of the invention have been described in detail for purposes of illustration, various modifications and enhancements may be made without departing from the spirit and scope of the invention. Accordingly, the invention is not to be limited except as by the appended claims

What is claimed is:

1. An ornamental structure comprising support means, said support means having a first side that holds a thin type planar TV and a second side, and an ornament mounted on the second side of said support means to decorate said thin type planar TV, said support means comprising a supporting arm and a sliding member coupled to said support arm, said sliding member having a part forming said first side that holds said thin type planar TV and said second side that holds said ornament, said sliding member being fixedly provided at a back side of said thin type planar TV.

2. The ornamental structure as claimed in claim 1, wherein said support means comprises a box frame.

3. The ornamental structure as claimed in claim 1, wherein said support means comprises a supporting arm, and a sliding member coupled to said support arm, said sliding member having a part forming said first side that holds said thin type planar TV and said second side that holds said ornament.

4. The ornamental structure as claimed in claim 1, wherein said ornament is an artwork.

5. The ornamental structure as claimed in claim 2, wherein said support means further comprises two suspension arms respectively pivoted to two opposite lateral sides of said box frame to support said fox frame on a vertical wall, allowing said box frame to be rotated relative to said suspension arms to reverse said ornament and said thin type planar TV.

6. The ornamental structure as claimed in claim 1, wherein said support means comprises a supporting arm, said supporting arm having a first end fixedly provided with a mounting board for fastening to a flat wall and a second end terminating in an upward coupling portion, and a sliding member forming said box frame, said sliding member being fixedly connected between said ornament and said thin type planar TV and having a transversely extending coupling groove coupled to said upward coupling portion of said supporting arm for enabling said ornament and said thin type planar TV to be reversed after said sliding member having been moved horizontally relative to said supporting arm to one lateral side.

7. The ornamental structure as claimed in claim 6, wherein said supporting arm has a L-shaped profile.

8. A support structure comprising a supporting arm, said supporting arm having a first end, a second end, and an upward coupling portion provided at said second end, a mounting board fixedly provided at the first end of said supporting arm for fastening to a flat wall, and a sliding member, said sliding member being fixedly connected between an ornament and a thin type planar TV and having a transversely extending coupling groove coupled to said upward coupling portion of said supporting arm for enabling said ornament and said thin type planar TV to be reversed after said sliding member having been moved horizontally relative to said supporting arm to one lateral side.

9. The support structure as claimed in claim 8, wherein said supporting arm has a L-shaped profile.

10. The support structure as claimed in claim 8, wherein said ornament is an artwork.

11. The support structure as claimed in claim 10, wherein said artwork is a picture.

* * * * *